United States Patent [19]

Shanley

[11] Patent Number: 4,646,358
[45] Date of Patent: Feb. 24, 1987

[54] SIGNALING ARRANGEMENT FOR TWO-WAY RADIO COMMUNICATION

[75] Inventor: Charles W. Shanley, Plantation, Fla.
[73] Assignee: Motorola, Inc., Schaumburg, Fla.
[21] Appl. No.: 882,448
[22] Filed: Jul. 7, 1986

Related U.S. Application Data

[63] Continuation of Ser. No. 576,690, Feb. 3, 1984, abandoned.

[51] Int. Cl.⁴ .................... H04B 7/00; H04Q 7/00
[52] U.S. Cl. .................................. 455/35; 455/38; 340/825.48; 340/825.52
[58] Field of Search ............... 455/36, 35, 38, 49, 455/53, 54, 56, 4; 340/825.44, 825.47, 825.48, 825.52, 825.07, 696; 370/13, 60

[56] References Cited

U.S. PATENT DOCUMENTS

| | | | |
|---|---|---|---|
| 3,644,891 | 2/1972 | McCrea | 340/825.53 |
| 3,766,523 | 10/1973 | Brocker et al. | 340/825.75 |
| 3,944,724 | 3/1976 | Kilby et al. | 455/351 |
| 4,284,976 | 8/1981 | Gable et al. | 340/825.53 |
| 4,352,955 | 10/1982 | Kai et al. | 455/31 |
| 4,403,212 | 9/1983 | Masaki | 340/825.44 |
| 4,422,071 | 12/1983 | de Graaf | 340/825.44 |
| 4,451,827 | 5/1984 | Kahn et al. | 370/60 |
| 4,546,467 | 10/1985 | Yamamoto | 370/13 |

OTHER PUBLICATIONS

Motorola publication # R8-1-67 "A Guide to the Golay Sequential Code (GSC)", by Brad Davis.
Motorola Technical Information Bulletin-TT-500 by Dick Fermoyle Jul. 1976, Portable Products "Digital Private-Line" Coded Squelch".

Primary Examiner—Jin F. Ng
Attorney, Agent, or Firm—Daniel K. Nichols; Joseph T. Downey; Donald B. Southard

[57] ABSTRACT

A radio transceiver includes a read only memory (ROM) for storing an origination code and a random access memory (RAM) for storing a destination code. The destination code may be manually entered into the RAM via a keypad or it may be entered remotely from another transceiver. In signalling between two transceivers, the destination code is transmitted followed by the origination code indicating the transmission's origin. In this manner coded squelch communications may take place between two parties without the necessity of reverting to carrier squelch operation while obtaining enhanced user privacy and flexibility.

7 Claims, 2 Drawing Figures

SIGNALING ARRANGEMENT FOR TWO-WAY RADIO COMMUNICATION

This is a continuation of application Ser. No. 576,690, filed 02/03/84 now abandoned.

BACKGROUND OF THE INVENTION

1. Field of the Invention

This invention relates generally to the field of coded squelch signalling for two-way radio communications and more particularly to an improved signalling arrangement providing enhanced privacy in a multiple user two-way radio channel.

2. Background of the Invention

Various forms of coded squelch have been utilized to enable large numbers of users to occupy a single radio frequency channel while maintaining privacy of conversation within selected groups of users having the same code. Two such techniques of squelch coding are described in Motorola Technical Training Manual Number TT500 entitled *Portable Products - "Digital Private-Line Coded Squelch"*, the contents of which is hereby incorporated by reference. In these two squelch coding techniques, a tone or a digital code word is continuously transmitted along with voice information in order to enable the receiving radios audio circuitry. Only those radios having the proper tone code or digital code word will respond to such appropriately encoded transmitted signals.

In another type of coded squelch system, individual users, repeaters or groups of users are assigned individual identification codes which may be either a digital word or a sequence of tones having a particular set of frequencies. This code is transmitted at the first of a communication to establish contacts between two users. After the initial contact conversation is carried out using uncoded squelch or carrier squelch.

Each of these systems have the inherent disadvantage of allowing privacy only between particular groups having different codes. All users having the same code have access to the conversation but cannot communicate outside their assigned group. In the latter signalling arrangement the majority of the conversation must be carried out in the carrier squelch mode. In each system, selective calling any single user of a large group is not practical. The present invention overcomes these difficiencies.

SUMMARY OF THE INVENTION

It is an object of the present invention to provide an improved signalling scheme for two-way radio communications.

It is another object of the present invention to provide a transceiver arrangement for practicing the improved signalling scheme of the present invention.

It is a further object of the present invention to provide an improved method of operating a radio transceiver for enhanced privacy during radio communications.

These and other objects of the invention will become apparent to those skilled in the art upon consideration of the following description of the invention.

In one embodiment of the present invention, a coded squelch radio transciever includes a transmitter and a read only memory (ROM) for storing an origination code. A random access memory (RAM) is utilized for storing a destination code and a keypad is coupled to the RAM for providing the RAM with the destination code. An encoder is coupled to the ROM, RAM and the transmitter for modulating the transmitter with a representation of the origination code and the destination code.

A method of operation of a radio transceiver according to the present invention, includes the steps of retreiving a destination code from memory, modulating a transmitter with a destination code, retrieving an origination code from memory, and modulating the transmitter with the origination code.

Another method of operation of the radio transceiver of the present invention includes the steps of receiving a radio signal including a destination code and origination code, comparing the destination code with an identifying code stored in the transceiver, and storing the origination code if the destination code and the identifying code are the same.

The features of the invention believed to be novel are set forth with particularity in the appended claims. The invention itself however, both as to organization and method of operation, together with further objects and advantages thereof, may be best understood by reference to the following description taken in conjunction with the accompanying drawings.

DETAILED DESCRIPTION OF THE PREFERRED EMBODIMENT

Figures 1, 2:
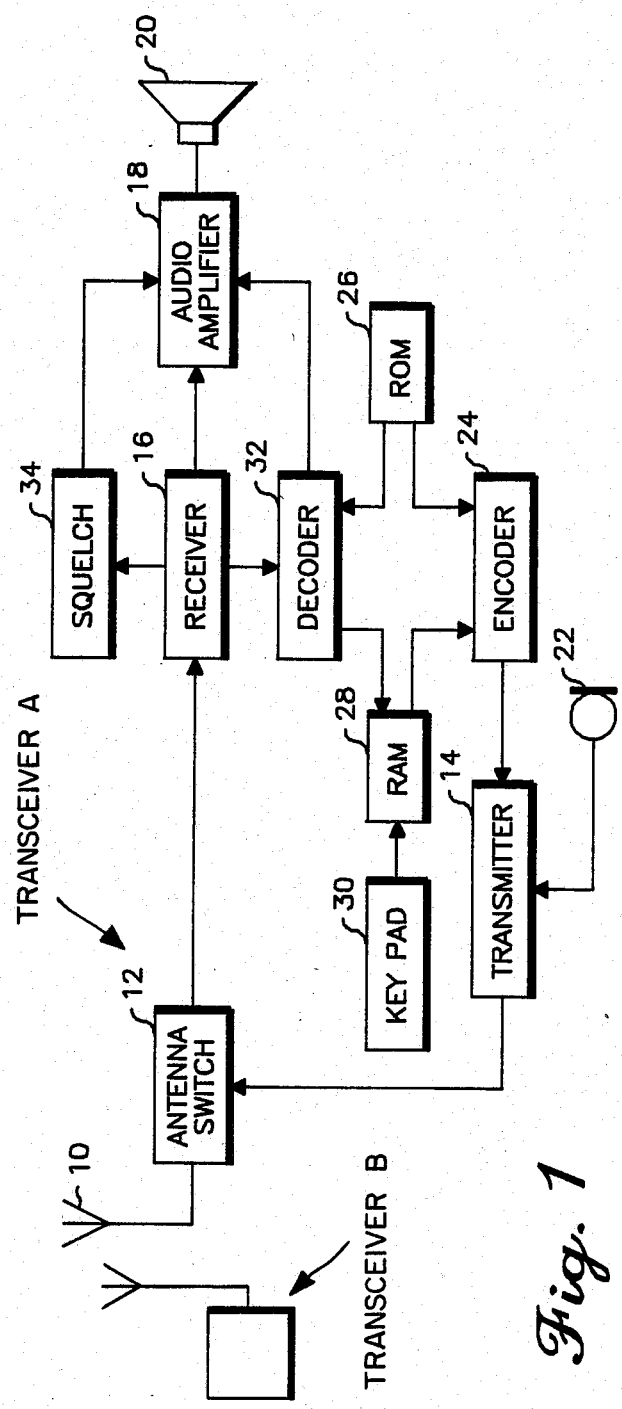
FIG. 1 is a block diagram of a radio communication system including a block diagram of the radio transceiver A according to the present invention.
FIG. 2 shows the preferred signalling and message format used in the present invention.

Turning now to FIG. 1, transceivers A and B are shown. Each having an antenna 10 coupled to an antenna switch 12 which appropriately routes the signal either from a transmitter 14 or to a receiver 16 when transmitting or receiving respectively. Receiver 16 is coupled to an audio amplifier 18, in the preferred embodiment, and audio amplifier 18 drives a loudspeaker 20.

A microphone 22 is coupled to the transmitter 14 for appropriate modulation of voice or other audio signals. Also coupled to transmitter 14 is an encoder 24. In the preferred embodiment an encoder 24 receives signals from a ROM 26 which is used to store an origination code or an appropriate representation thereof and a RAM 28 is used to store a destination code or an appropriate representation thereof. The destination code may be manually entered into RAM 28 by means of key pad 30 or any other convenient input arrangement.

A decoder 32 is coupled to receiver 16 for decoding coded signals received by receiver 16. Typically this is accomplished by converting a signal coming in through receiver 16 into a usable form and then comparing the signal with the code words stored and ROM 26. If the incoming code word matches the identifying code word in ROM 26 the decoder 32 may then store an origination code in RAM 28. Therefore decoder 32 is also coupled to ROM 26 and RAM 28.

Turning now to FIG. 2, a preferred signalling format is shown. Preferrably each transmission would begin with the transmission (by transceiver A) of a destination code which may be a digital code word, sequence of tones, etc. Each transceiver on the specified radio channel inspects the destination code to see if it matches its own identifying code stored in ROM. If a match is not found the receiving transceiver (transceiver B) remains squelched. If a match is found, however, decoder 32 of transceiver B then looks for the next code which is an origination code. The origination code is the identifying code of the transmitting transceiver A. The origination code is then stored in RAM 28 of transceiver B for later use.

Having established that the destination code and the identification code are identical, communications between the two transceivers may take place in a comparitively user transparent manner. On the first transmission by transceiver B, the identifying code of transceiver A is fetched from RAM 28 and transmitted as the new destination code by transceiver B. Encoder 24 of transceiver B then fetches its own identifying code from ROM 26 and transmits it for storage in RAM 28 of transceiver A. That is, on transmissions by the transceiver B, the identifying code of transceiver A is fetched from RAM 28 and transmitted as the destination code. Encoder 24 then fetches transceiver B's identifying code from ROM 26 and transmits it for storage in transceiver A's RAM. In this manner communications may take place on an individual basis in a coded squelch mode throughout. When a larger body of users must be contacted, each of their individual identifying codes can be transmitted to establish initial contact and conversation may then revert to the carrier squelch mode as in the prior art. It is therefore desirable for each transceiver to include a conventional squelch circuit 34 coupled to the receiver and the audio amplifier.

In the alternative, a group of users may be addressed by having more than one identifying code per transceiver. In this manner one identifying code will serve as an individual call identifying code and one or more other identifying codes will serve as group call identifying codes. The group call identifying codes are shared by a number of transceivers in a group which may be addressable as a group. In this embodiment the decoder will compare each received destination code with all such codes stored in ROM 26 and respond to any incoming destination codes which appropriately correlate therewith.

Returning now to FIG. 2, the preferred signalling format of each transmission is shown. First a destination code is transmitted which identifies the party being called. This destination code is followed by an origination code which is used by the party being called to determine the origin of the transmission. Next, the actual message occurs. This message although shown to be voice message may readily be a data or other type of message as those skilled in the art will readily appreciate.

In the preferred embodiment, an end of message code is trnsmitted after the actual message. The use of such of end of message codes to quiet long squelch tails and/or to provide the users with verification of the end of the message are well known in the art. Such end of message codes are sometimes referred to as "reverse burst". While the preferred embodiment utilizes an end of message code it will be clear to those skilled in the art that this may be viewed as optional.

It will also occur to those skilled in the art that the actual message format may vary without departing from the spirit of the present invention. For example, the origination code may be transmitted after the message or after the end of message code. Similarly, continuous tone or continuously repeated digital words may be transmitted in conjunction with the message to serve as the destination code similar to the Motorola "Digital Private Line" (DPL) system. In such a configuration, the originating code would preferably be transmitted at the end of the message. Various other message format arrangements will occur to those skilled in the art and will lend themselves more appropriately to certain coding formats than others.

Similarly, while the actual transceiver portions of the block diagram of FIG. 1, such as receiver 16, transmitter 14, antenna switch 12, squelch 34, audio amplifier 18, loudspeaker 20, and antenna 10 may be conventional blocks such as those used in conventional FM two-way transceivers, decoder 32 and encoder 24 are specialized circuits individually adapted to the particular squelch coding format being used. However, one skilled in the art will know that decoder 32 and encoder 24 will be similar to or may be adapted from circuitry used for decoding and encoding operations and other squelch coding formats. For example, if a five-tone sequential coding format such as is commonly used in European systems is used, decoder 32 and encoder 24 may be readily adapted by one skilled in the art from encoders and decoders utilized in conventional five-tone sequential coding systems. Such circuitry is known and used in the Motorola MT700 TM series of transceivers as well as others.

While the tones themselves may not be readily adapted for storage in memory elements, appropriate digital representations of or codes for those tones may be. For purposes of this document, no distinction should be made between whether the code itself or a machine usable representation of the code is stored, modulated or transmitted.

Thus it is apparent that in accordance with the present invention, an apparatus that fully satisfies the objectives, aims and advantages is set forth above. While the invention has been described in conjunction with a specific embodiment, it is evident that many alternatives, modifications and variations will become apparent to those skilled in the art in light of the foregoing description. Accordingly, it is intended that the present invention embrace all such alternatives, modifications and variations as fall within the spirit and broad scope of the appended claims.

What is claimed is:

1. A method of coded squelch operation of radio transceivers in a two-way radio communication system comprising the steps of:

entering a code representation of a squelch code of a second transceiver into a first memory of a first transceiver;

retrieving said code representation of said squelch code of said second transceiver from said first memory of said first transceiver;

modulating a transmitter signal of said first transceiver with said squelch code of said second transceiver;

retrieving a code representation of a squelch code of the first transceiver from a second memory of the first transceiver; and modulating said transmitter signal of said first transceiver with the squelch code of the first transceiver receiving and decoding said squelch code of said second transceiver from said transmitter signal of said first transceiver at said second transceiver, comparing and correlating said decoded squelch code of said second transceiver with a representation of the squelch code of said second transceiver stored in a first memory in said second transceiver, receiving and decoding said squelch code of said first transceiver from said transmitter signal of said first transceiver at said second transceiver, and storing a representation of said squelch code of said first transceiver decoded from said transmitter signal of said first transceiver in a second memory of said second transceiver if said decoded squelch code of said second transceiver and said representation of the squelch code of said second transceiver stored in the first memory in said second transceiver are appropriately correlated, and after the end of said transmitter signal of said first transceiver, retrieving said representations of said squelch codes of said first and second transceivers stored in the first and second memories in said second transceiver and modulating a transmitter signal of said second transceiver with said squelch codes of said first and second transceivers if said decoded squelch code of said second transceiver and said representation of the squelch code of said second transceiver stored in the first memory in said second transceiver are appropriately correlated.

2. The method of claim 1 comprising the further steps of:

modulating said transmitter signal of said first transceiver with voice signals, and modulating said transmitter signal of said second transceiver with voice signals.

3. A coded squelch radio transceiver for two-way radio communications in a coded squelch radio system, comprising:

a transmitter for producing a transmitter signal;

first storage means for storing a first code representation corresponding to a squelch code for identification of said transceiver;

second storage means for storing a second code representation corresponding to a second squelch code, said second squelch code representing a destination code for another transceiver in the radio system;

input means, coupled to said second storage means, for entering said second code representation into said second storage means;

encoder means, coupled to said transmitter, and said first and second storage means, for fetching said second code representation and said first code representation from said second and said first storage means respectively, and for modulating said transmitter signal with said second squelch code and said first squelch code of said transceiver for communicating with said another transceiver;

a receiver for receiving incoming signals including first and second squelch codes respectively representing the identidication and destination codes transmitted by other transceivers; and decoder means, coupled to said receiver and said first and second storage means, for comparing and correlating decoded incoming second squelch codes in said incoming signals with said first code representation, and for storing representations of incoming first squelch codes in said second storage means as said second code representation if said decoded incoming second squelch codes and said first code representation are appropriately correlated, whereby said transceiver produces a transmitter signal directed to another transceiver from which said incoming signals are received without further entering of said second code representation into said second storage means for responding to communications from said another transceiver.

4. The radio transceiver of claim 3, wherein said input means includes manual input means.

5. The radio transceiver of claim 4, wherein said manual input means includes a keypad.

6. The transceiver of claim 3, wherein;

said first and second squelch codes comprise tone codes.

7. The transceiver of claim 3, wherein;

said first and second squelch codes comprise digital codes.

* * * * *